United States Patent
Su et al.

(10) Patent No.: US 12,513,257 B2
(45) Date of Patent: Dec. 30, 2025

(54) METHOD, PROCESSING DEVICE, AND SYSTEM FOR INFORMATION DISPLAY

(71) Applicant: Industrial Technology Research Institute, Hsinchu (TW)

(72) Inventors: Yu-Hsuan Su, Kaohsiung (TW); Hsin-Hung Chen, Kaohsiung (TW); Ting-Hsun Cheng, Chiayi County (TW); Yu-Ju Chao, Hsinchu County (TW); Chi-Wen Jung, Miaoli County (TW); Chia-Hsun Tu, Taipei (TW)

(73) Assignee: Industrial Technology Research Institute, Hsinchu (TW)

( * ) Notice: Subject to any disclaimer, the term of this patent is extended or adjusted under 35 U.S.C. 154(b) by 189 days.

(21) Appl. No.: 18/177,764

(22) Filed: Mar. 3, 2023

(65) Prior Publication Data
US 2024/0236257 A1     Jul. 11, 2024

(30) Foreign Application Priority Data
Jan. 5, 2023 (TW) ................. 112100414

(51) Int. Cl.
*G09G 5/00* (2006.01)
*G06T 11/00* (2006.01)
(Continued)

(52) U.S. Cl.
CPC ........... *H04N 5/2628* (2013.01); *G06T 11/00* (2013.01); *G06V 20/56* (2022.01); *H04N 23/69* (2023.01);
(Continued)

(58) Field of Classification Search
CPC ............. G09G 5/14; G09G 2340/10; G09G 2340/125; G06T 11/60; G06T 15/503;
(Continued)

(56) References Cited

U.S. PATENT DOCUMENTS

| 8,923,566 B2 | 12/2014 | Hsieh et al. |
| 10,521,668 B2 | 12/2019 | Aoyama et al. |

(Continued)

FOREIGN PATENT DOCUMENTS

| CN | 111325753 | 6/2020 |
| TW | I719343 | 2/2021 |
| TW | 202242482 | 11/2022 |

OTHER PUBLICATIONS

"Office Action of Taiwan Counterpart Application", issued on Jun. 21, 2023, p. 1-p. 8.

*Primary Examiner* — Gordon G Liu
(74) *Attorney, Agent, or Firm* — JCIPRNET (57) ABSTRACT

A method, a processing device, and a system for information display are proposed. The information display system is installed on a mobile vehicle and includes a light transmitting display, an image capturing device configured to capture a target image of a target object, a positioning device configured to generate position information of the mobile vehicle, and a processing device configured to perform the following operations. First reference position information of the target object is calculated according to the position information of the mobile vehicle. Object recognition processing is performed on the target image. A display position of virtual information of the target object is determined using a recognition result of the object recognition processing or the first reference position information according to the recognition result of the object recognition processing. The virtual information is displayed through the light transmitting display according to the display position of the virtual information.

18 Claims, 8 Drawing Sheets

(51) Int. Cl.
*G06V 20/56* (2022.01)
*H04N 5/262* (2006.01)
*H04N 23/69* (2023.01)
*G02B 27/01* (2006.01)

(52) U.S. Cl.
CPC .. *G02B 27/0101* (2013.01); *G02B 2027/0138* (2013.01); *G02B 2027/014* (2013.01)

(58) Field of Classification Search
CPC . G06T 2207/30196; G06T 2207/10016; G06T 7/13; G06T 7/50; G06T 2200/24; G06T 2207/10024; G06T 2207/20221; G06T 11/203; G06T 11/00; G06F 3/017; G06V 20/56; H04N 23/69; G02B 27/001; G02B 2027/0138; G02B 2027/014
USPC ............................................................ 345/629
See application file for complete search history.

(56) References Cited

U.S. PATENT DOCUMENTS

| | | | |
|---|---|---|---|
| 2002/0138374 A1* | 9/2002 | Jennings | G06Q 10/0875 705/29 |
| 2012/0281119 A1 | 11/2012 | Ohba et al. | |
| 2017/0113702 A1* | 4/2017 | Thieberger-Navon | B60W 50/0097 |
| 2019/0079599 A1* | 3/2019 | Lee | G06F 3/0346 |
| 2020/0324787 A1* | 10/2020 | Wang | B60W 40/02 |
| 2022/0334388 A1* | 10/2022 | Dai | G06V 20/56 |

\* cited by examiner

METHOD, PROCESSING DEVICE, AND SYSTEM FOR INFORMATION DISPLAY

CROSS-REFERENCE TO RELATED APPLICATION

This application claims the priority benefit of Taiwanese application no. 112100414, filed on Jan. 5, 2023. The entirety of the above-mentioned patent application is hereby incorporated by reference herein.

BACKGROUND

Technical Field

The technical field relates to a method, a processing device, and a system for information display.

Background

With the development of image processing technology and spatial positioning technology, applications of augmented reality to transparent displays have gradually received attention. With such technology, when combined with physical objects and supplemented with displayed virtual information, the transparent display may produce interactive experiences and present information relatively intuitively depending on requirements of a user. Further, the virtual information associated with the physical object may be displayed at a specific position on the transparent display for the user to view the physical object and the virtual information overlapped on or at one side of the physical object through the transparent display at the same time.

In an application scenario where augmented reality is combined with a mobile vehicle, the transparent display may serve as a window screen on the mobile vehicle. A passenger of the mobile vehicle may view an external landscape and landscape information provided by the transparent display at the same time. It follows that, since the passenger moves with the mobile vehicle, the relative positions of the physical object relative to the passenger and the field of view of the passenger also change accordingly. To display the virtual information at a position where the passenger may intuitively view the virtual information in comparison with the physical object, it is a topic to accurate estimating the relative positional relationships of the physical object relative to the mobile vehicle or the user. In obtaining the relative positional relationships of the physical object relative to the mobile vehicle or the user with a single positioning technology (e.g., GPS positioning technology or image positioning technology), incorrect image recognition, unsatisfactory positioning precision, or insufficient number of samples may exist, and overlapping errors may occur, resulting in difficulty and discomfort in viewing the virtual information.

SUMMARY

The disclosure provides a method, a processing device, and a system for information display.

In an exemplary embodiment of the disclosure, an information display system is installed on a mobile vehicle, and includes a light transmitting display, an image capturing device, a positioning device, and a processing device. The image capturing device is configured to capture a target image of a target object. The positioning device is configured to generate position information of the mobile vehicle. The processing device is communicatively connected to the light transmitting display, the image capturing device, and the positioning device. The processing device is configured to: calculate first reference position information of the target object according to the position information of the mobile vehicle; perform object recognition processing on the target image; determine a display position of virtual information of the target object using a recognition result of the object recognition processing or the first reference position information according to the recognition result of the object recognition processing; and display the virtual information through the light transmitting display according to the display position of the virtual information.

In an exemplary embodiment of the disclosure, an information display method is applicable to an information display system including a light transmitting display, an image capturing device, a positioning device, and a processing device. The information display system is installed on a mobile vehicle. The information display method includes the following. The image capturing device is configured to capture a target image of a target object. The positioning device is configured to generate position information of the mobile vehicle. First reference position information of the target object is calculated according to the position information of the mobile vehicle. Object recognition processing is performed on the target image. A display position of virtual information of the target object is determined using a recognition result of the object recognition processing or the first reference position information according to the recognition result of the object recognition processing. The virtual information is displayed through the light transmitting display according to the display position of the virtual information.

In an exemplary embodiment of the disclosure, a processing device is installed on a mobile vehicle and is communicatively connected to a light transmitting display, an image capturing device, and a positioning device. The image capturing device is configured to capture a target image of a target object. The positioning device is configured to generate position information of the mobile vehicle. The processing device includes a memory and a processor. The memory is configured to store data. The processor is connected to the memory. The processor is configured to: calculate first reference position information of the target object according to the position information of the mobile vehicle; perform object recognition processing on the target image; determine a display position of virtual information of the target object using a recognition result of the object recognition processing or the first reference position information according to the recognition result of the object recognition processing; and display the virtual information through the light transmitting display according to the display position of the virtual information. Several exemplary embodiments accompanied with figures are described below to further describe the disclosure.

BRIEF DESCRIPTION OF THE DRAWINGS

The accompanying drawings are included to provide further understanding, and are incorporated in and constitute a part of this specification. The drawings illustrate exemplary embodiments and, together with the description, serve to explain the principles of the disclosure.

DESCRIPTION OF THE EMBODIMENTS

Some exemplary embodiments of the disclosure accompanied with the drawings will be described below. The same reference numerals used in the following description or shown in different drawings will be regarded as the same or similar elements. These exemplary embodiments are only a part of the disclosure, and do not disclose all possible implementations of the disclosure. More accurately, these exemplary embodiments are merely examples of a method, a device, and a system within the scope of the appended claims of the disclosure.

Figure 1A:
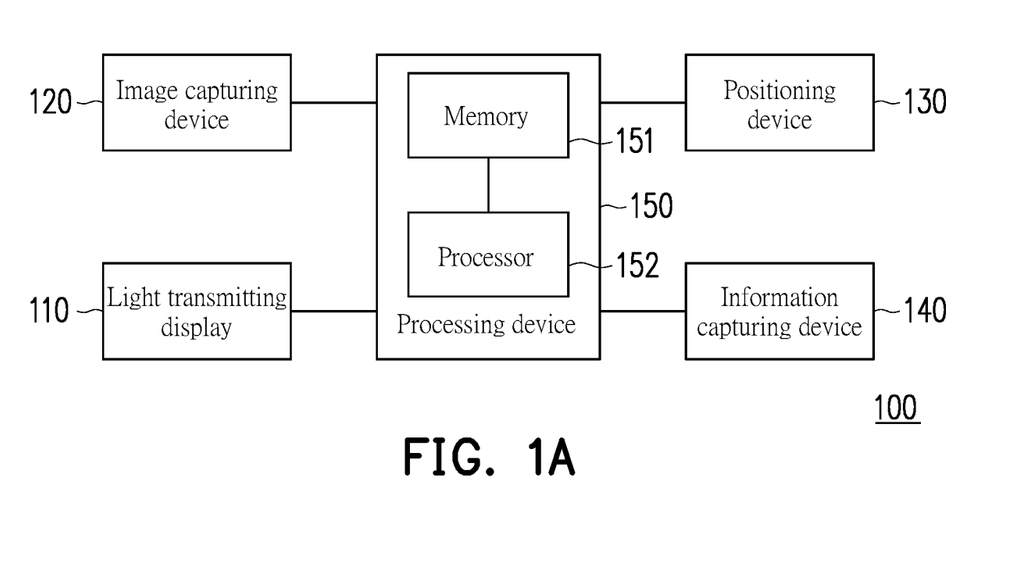
FIG. 1A is a block diagram of an information display system according to an exemplary embodiment of the disclosure.

FIG. 1A is a block diagram of an information display system according to an exemplary embodiment of the disclosure. First, FIG. 1A introduces the components and configuration relationships in the system, and the functions will be disclosed in subsequent exemplary embodiments accompanied with flowcharts together.

With reference to FIG. 1A, in this exemplary embodiment, an information display system 100 may be installed on a mobile vehicle. The mobile vehicle may be a form of transportation, an entertainment machine, or the like, for example, a cable car, an automotive, a tour bus, a ship, an airplane, or the like. The information display system 100 may include a light transmitting display 110, an image capturing device 120, a positioning device 130, and a processing device 150. In an exemplary embodiment, the information display system 100 may further include an information capturing device 140. The processing device 150 may be wirelessly, wiredly, or electrically connected to the light transmitting display 110, the image capturing device 120, the positioning device 130, and the information capturing device 140.

The light transmitting display 110 may be configured to display information, and may be a transmissive-mode light transmitting display including a liquid crystal display (LCD), a field sequential color LCD, a light-emitting diode (LED) display, an electrowetting display, or may be a projection-mode light transmitting display. The light transmitting display 110 may be implemented as a window screen of the mobile vehicle. A user inside the mobile vehicle may view a scene outside the mobile vehicle through the light transmitting display 110, and the content viewed by the user may be the scene outside including overlapped virtual information.

The image capturing device 120 is configured to capture a target image of a target object located outside the mobile vehicle. In other words, the image capturing device 120 may photograph the target object in a physical scene outside the mobile vehicle to obtain the target image. The image capturing device 120 may be at least one image sensor or at least one image sensor with at least one depth sensor, for example, for image recognition and positioning on the target object. The image sensor may include a visible light sensor or an invisible light sensor, such as an infrared sensor.

The positioning device 130 is configured to generate position information of the mobile vehicle. The positioning device 130 may be a GPS locator, a gyro compass, a magnetic compass, an electronic compass, an altitude sensor, or an inertial sensor, for example. The inertial sensor is an accelerometer or a gyroscope, for example. Devices or a combination thereof that provide spatial position information and moving direction information of the mobile vehicle belong to the scope of the positioning device 130. For example, the positioning device 130 may be configured to provide GPS information, direction information, and/or tilt information of the mobile vehicle to the processing device 150.

The information capturing device 140 is configured to capture spatial position information of the user. The information capturing device 140 may be at least one image sensor or at least one image sensor with at least one depth sensor, for example, for image recognition and positioning on the user. The image sensor may include a visible light sensor or an invisible light sensor, such as an infrared sensor. In addition, the information capturing device 140 may be an optical locator, for example, for positioning on the user in an optical space. Devices or a combination thereof that position the user to obtain the position information thereof belong to the scope of the information capturing device 140.

In an exemplary embodiment of the disclosure, the image sensor may be configured to capture an image, and includes a camera lens having a lens element and a photosensitive element. The depth sensor may be configured to detect depth information, and may be realized by utilizing active depth sensing technology and passive depth sensing technology. Active depth sensing technology may calculate depth information by actively emitting light sources, infrared rays, ultrasonic waves, lasers, and the like as signals used with time-of-flight ranging technology. Passive depth sensing technology may calculate depth information by utilizing parallax of two images in front of two image sensors and captured by the two image sensors from different angles of view.

The processing device 150 is configured to control operation of the information display system 100, and may include a memory 151 and a processor 152. In some embodiments, the processing device 150 may be one computer device or a combination of multiple computer devices, which is not limited by the disclosure. When the processing device 150 is implemented as multiple computer devices, these computer devices may be connected and communicate with each other.

The memory 151 may be any type of fixed or removable random-access memory (RAM), read-only memory (ROM), flash memory, hard disk drive, or any other similar device, integrated circuit, and a combination thereof, for example. The processor 152 may be a central processing unit (CPU), an application processor (AP), or any other programmable general-purpose or special-purpose microprocessor, digital signal processor (DSP), image signal processor (ISP), graphics processing unit (GPU), or any other similar device, integrated circuit, and a combination thereof, for example.

Figure 1B:
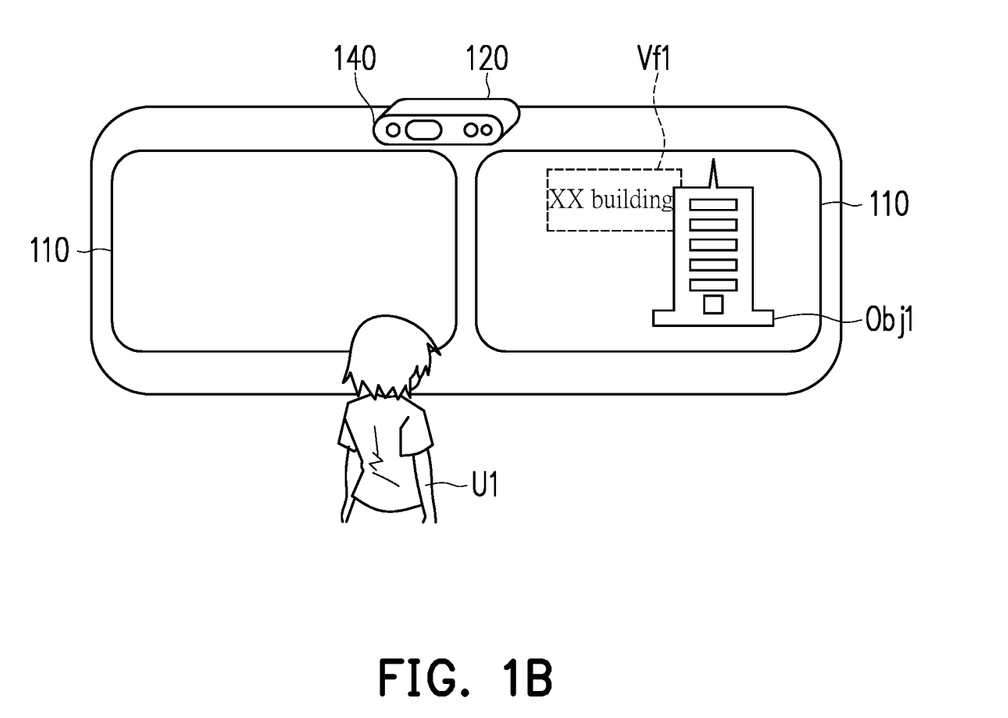
FIG. 1B is a schematic diagram of an information display system according to an exemplary embodiment of the disclosure.

FIG. 1B is a schematic diagram of an information display system according to an exemplary embodiment of the disclosure. With reference to FIG. 1B, for example, the light transmitting display 110 may be implemented as a window screen of the mobile vehicle (e.g., a ship), and the light transmitting display 110 may be formed of one or more light transmitting display devices. In FIG. 1B, two transparent display devices are taken as an example for convenience and clarity in description, but the disclosure is not limited thereto.

A user U1 inside the mobile vehicle and a target object Obj1 outside the mobile vehicle are respectively located on different sides of the light transmitting display 110. The user U1 may view a physical scene overlapped with virtual information Vf1 of the target object Obj1 through the light transmitting display 110. The target object Obj1 is a building, a landscape, or an animal or plant, for example. The virtual information Vf1 may be regarded as augmented reality content that is augmented based on the target object Obj1. The image capturing device 120 may capture a target image toward the target object Obj1. The information capturing device 140 may capture a user image toward the user U1 to further obtain spatial position information of the user U1. The processing device 150 may determine a display position of the virtual information Vf1 on the display 110 according to information provided by each of the image capturing device 120, the positioning device 130, and the information capturing device 140. Details of performing a process of an information display method by the processing device 150 accompanied with the elements of the display system 100 will be described in the following exemplary embodiments.

Figure 2:
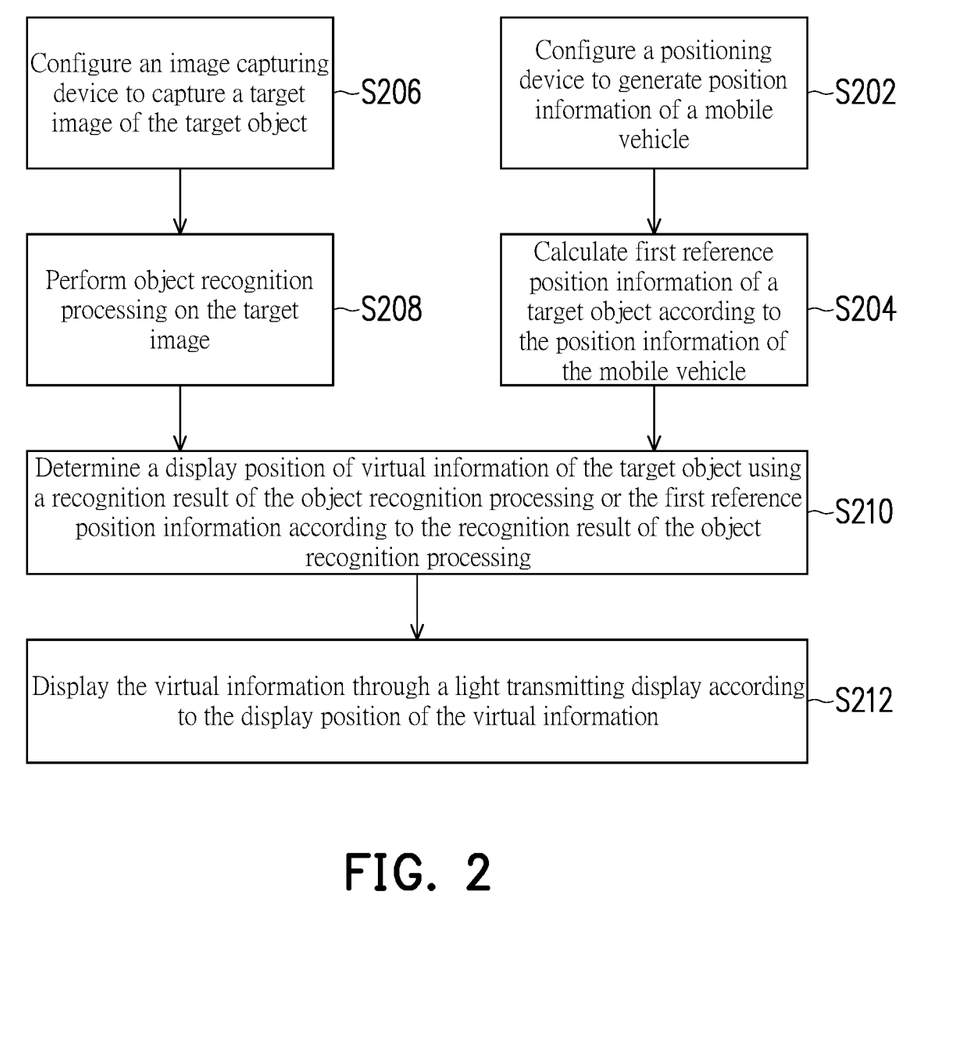
FIG. 2 is a flowchart of an information display method according to an exemplary embodiment of the disclosure.

FIG. 2 is a flowchart of an information display method according to an exemplary embodiment of the disclosure. With reference to FIG. 1A, FIG. 1B, and FIG. 2 together, the process of the method of FIG. 2 may be realized by the information display system 100 of FIG. 1A and FIG. 1B. Here, the user U1 inside the mobile vehicle may view a physical scene outside the mobile vehicle and virtual information related thereto through the light transmitting display 110 of the information display system 100.

In step S202, the processing device 150 configures the positioning device 130 to generate position information of a mobile vehicle. The positioning device 130 may generate absolute position information of the mobile vehicle, such as a GPS position or altitude information. In addition, the positioning device 130 may also generate absolute direction information of a moving direction of the mobile vehicle, such as an absolute azimuth or an absolute direction relative to the north in the world coordinate system. The positioning device 130 may also generate three-axis motion angles of the mobile vehicle, which may include pitch, yaw, and roll.

In step S204, the processing device 150 calculates first reference position information of the target object Obj1 according to the position information of the mobile vehicle. The first reference position information is information related to the relative positional relationships between the target object Obj1 and the mobile vehicle, and may serve to determine a display position of the virtual information Vf1 of the target object Obj1 on the light transmitting display 110. In some embodiments, the first reference position information includes a first display position coordinate on the light transmitting display 110. In other words, the first reference position information may be the display position coordinates on the light transmitting display 110 calculated based on the relative positional relationships between the target object Obj1 and the mobile vehicle. Alternatively, in some embodiments, the first reference position information is the relative positional relationships between the target object Obj1 and the mobile vehicle. For example, the first reference position information may be a relative angle between the moving direction of the mobile vehicle and the direction of the target object Obj1 relative to the mobile vehicle.

In some embodiments, the processing device 150 may obtain the relative angle of the target object Obj1 relative to the mobile vehicle according to the position information and the moving direction of the mobile vehicle, the absolute direction (e.g., the north of the world coordinate system), and absolute position information of the target object Obj1. The absolute position information of the target object may be recorded in an object information database. For example, the object information database records absolute position information (e.g., GPS positions) of a plurality of predetermined target objects, object recognition codes respectively corresponding to the predetermined target objects, and relevant information corresponding to the predetermined target objects. The object information database may be stored in the memory 151 or obtained from a cloud server through a communication interface (not shown). Moreover, the processing device 150 may calculate a distance between the mobile vehicle and the target object Obj1 according to the position information of the mobile vehicle and the absolute position information of the target object. After that, the processing device 150 may calculate the first reference position information of the target object Obj1 according to the relative angle and the distance, and the first reference position information may be the display position coordinates on the light transmitting display 110.

Figure 3A:
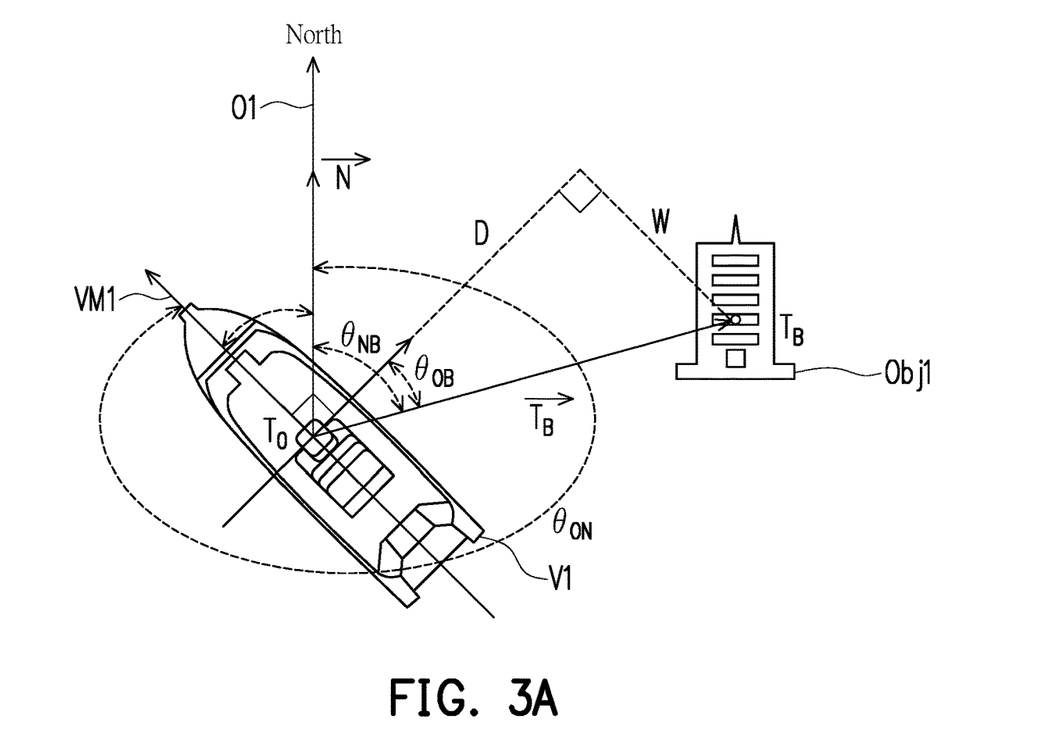
FIG. 3A and FIG. 3B are schematic diagrams of calculating first reference position information according to an exemplary embodiment of the disclosure.
Figure 3B:
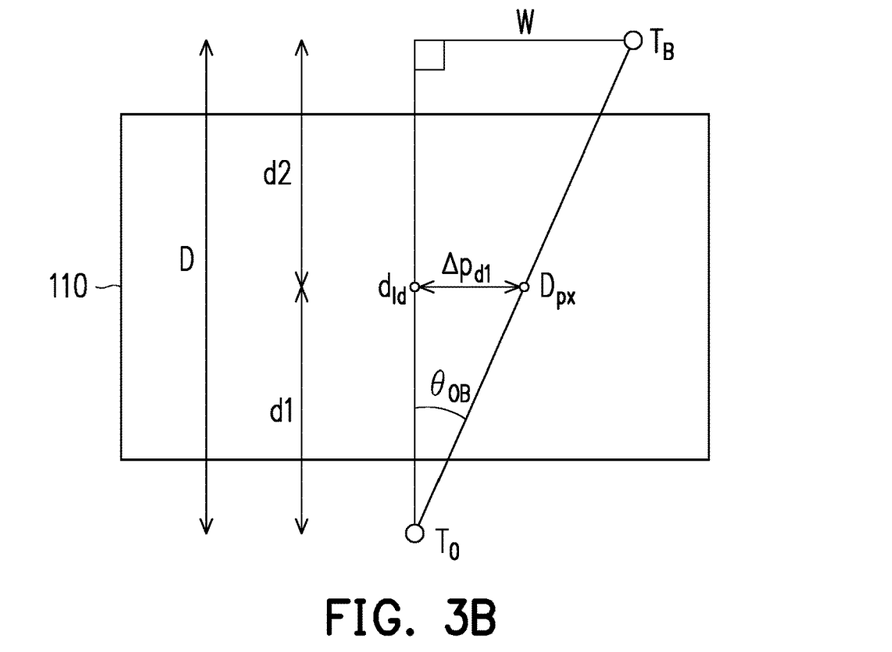

FIG. 3A and FIG. 3B are schematic diagrams of calculating first reference position information according to an exemplary embodiment of the disclosure. In this embodiment, a mobile vehicle V1 is described taking a ship as an example. The light transmitting display 110 may be implemented as viewing windows on two sides of the ship. It is assumed here that the normal direction of the display plane of the light transmitting display 110 is substantially perpendicular to a moving direction VM1 of the mobile vehicle V1.

In FIG. 3A, the positioning device 130 may generate a GPS position $T_O$ of the mobile vehicle V1 and the moving direction VM1 (i.e., sailing direction) of the mobile vehicle V1. On the basis that the object database records the absolute position information of the predetermined target objects, for example, the processing device 150 may recognize the target object Obj1 viewable by the user U1 through the light transmitting display 110 from the object database according to the GPS position $T_O$ and the moving direction VM1. Here, the processing device 150 may obtain the absolute position information of the target object Obj1 by querying from the object database, and the absolute position information of the target object Obj1 may be a GPS position $\vec{T_B}$. A distance $|\vec{T_B}|$ between the GPS position $T_O$ of the mobile vehicle V1 and the GPS position $T_B$ of the target object Obj1 may be calculated with reference to the radius of curvature of the Earth.

The distance $|\vec{T_B}|$ between the mobile vehicle V1 and the target object Obj1 may be obtained based on Formula (1) below.

$$hav\left(\frac{d}{r}\right) = hav(\varphi_2 - \varphi_1) + \cos(\varphi_1)\cos(\varphi_2)hav(\lambda_2 - \lambda_1) \quad \text{Formula (1)}$$

where d represents the distance between the mobile vehicle V1 and the target object Obj1; r represents the radius of curvature of the Earth; $\varphi_1$ is the latitude of the GPS position $T_0$; $\varphi_2$ is the latitude of the GPS position $T_B$; $\lambda_1$ is the longitude of the GPS position $T_0$; and $\lambda_2$ is the longitude of the GPS position $T_B$. Formula (1) may be transformed into Formula (2) below.

$$d = 2r \arcsin\left(\sqrt{hav(\varphi_2 - \varphi_1) + \cos(\varphi_1)\cos(\varphi_2)hav(\lambda_2 - \lambda_1)}\right) \quad \text{Formula (2)}$$

$$= 2r \arcsin\left(\sqrt{\sin^2\left(\frac{\varphi_2 - \varphi_1}{2}\right) + \cos(\varphi_1)\cos(\varphi_2)\sin^2\left(\frac{\lambda_2 - \lambda_1}{2}\right)}\right)$$

In addition, in FIG. 3A, the processing device 150 may obtain a relative angle $\theta_{OB}$ of the target object Obj1 relative to the mobile vehicle V1 according to the GPS position $T_0$ and the moving direction VM1 of the mobile vehicle V1, the north of the world coordinate system, and the GPS position $T_B$ of the target object Obj1. In this embodiment, the relative angle $\theta_{OB}$ is an angle between the relative direction of the target object Obj1 relative to the mobile vehicle V1 and the reference direction perpendicular to the moving direction VM1. The positioning device 130 may generate an angle $\theta_{ON}$ between the moving direction VM1 of the mobile vehicle V1 and the true north. The angle $\theta_{ON}$ may be obtained from Formula (3) below.

$$\theta_{NB} = \cos^{-1} \frac{\vec{N} \cdot \vec{T_B}}{|\vec{N}| \cdot |\vec{T_B}|} \quad \text{Formula (3)}$$

where $\vec{T_B}$ represents the vector between the GPS position $T_0$ and the GPS position $T_B$; and $\vec{N}$ represents the unit vector pointing to the true north.

After that, the processing device 150 may obtain the relative angle $\theta_{OB}$ of the target object Obj1 relative to the mobile vehicle V1 according to Formula (4) below.

$$\begin{cases} \theta_{OB} = \theta_{ON} + 90° - 360° - \theta_{NB}, & \text{if } \theta_{ON} + 90° > 360° \\ \theta_{OB} = \theta_{ON} + 90° - \theta_{NB}, & \text{if } \theta_{ON} + 90° \leq 360° \end{cases} \quad \text{Formula (4)}$$

As a result, on the basis that the relative angle $\theta_{OB}$ and the distance $|\vec{T_B}|$ between the GPS position $T_0$ of the mobile vehicle V1 and the GPS position $T_B$ of the target object Obj1 are known, the processing device 150 may obtain a distance W and a distance D according to Formula (5) and Formula (6) below.

$$W = d\sin\theta_{OB} \quad \text{Formula (5)}$$

$$D = d\cos\theta_{OB} \quad \text{Formula (6)}$$

where d represents the distance $|\vec{T_B}|$ between the GPS position $T_0$ and the GPS position $T_B$.

With reference to FIG. 3B, the processing device 150 may configure the information capturing device 140 to obtain a distance d1 between the user and the light transmitting display 110, and obtain a distance d2 according to the distance d1 and the distance D. The distance D is the length of the projection vector $\vec{T_B}$ projected in the normal direction of the light transmitting display 110, and may be generated according to Formula (6) above. The distance d2 is the distance D minus the distance d1. Accordingly, based on the principle of similar triangles, a distance $\Delta p_{d1}$ between a position coordinate $d_{ld}$ and a first display position coordinate $D_{px}$ in the X direction may be obtained according to the distance d1, the distance d2, and the distance W. The distance $\Delta p_{d1}$ in the X direction may be obtained according to Formula (7) below.

$$\Delta p_{d1} = \frac{d_1 \times W}{(d_1 + d_2)} \quad \text{Formula (7)}$$

On this basis, the first display position coordinate $D_{px}$ may be obtained according to Formula (8) below.

$$D_{px} = d_{ld} + \Delta p_{d1} \quad \text{Formula (8)}$$

where the position coordinate $d_{ld}$ is the center of the light transmitting display 110 in the X direction. It follows that the processing device 150 may calculate the first reference position information of the target object Obj1, that is, the first display position coordinate $D_{px}$, through the information provided by the positioning device 130.

In some embodiments, the X coordinate of the display position of the virtual information Vf1 may be determined according to the first display position coordinate $D_{px}$, for example, a predetermined value is added to or subtracted from the first display position coordinate $D_{px}$ to obtain the X coordinate of the display position of the virtual information Vf1. In addition, the Y coordinate of the display position of the virtual information Vf1 may be a predetermined value or may be determined according to the type of the target object Obj1. In other words, the processing device 150 may look up the table to obtain the Y coordinate of the display position of the virtual information Vf1 according to the object type, object name, or object recognition code of the target object Obj1.

Furthermore, with reference to FIG. 2 together, in step S206, the processing device 150 configures the image capturing device 120 to capture a target image of the target object Obj1. Next, in step S208, the processing device 150 performs object recognition processing on the target image. The processing device 150 may utilize a convolution neural network (CNN) model among deep learning algorithms to perform object recognition processing on the target image. For example, the convolutional neural network model includes R-CNN, Fast R-CNN, Faster R-CNN, YOLO, or SSD for object detection, but the disclosure is not limited thereto.

When the processing device 150 detects the existence of the target object Obj1 according to the target image, a recognition result of the object recognition processing is that there is recognition information of the target object Obj1. Comparatively, when the processing device 150 does not detect the existence of the target object Obj1 from the target image, the recognition result of the object recognition processing is that there is no recognition information of the target object Obj1. When the recognition result of the object recognition processing is that there is the recognition information of the target object Obj1, the recognition information may include the position and size of an object recognition bounding box of the target object Obj1 and the classification result (e.g., the object recognition code) of the target object Obj1. In an exemplary embodiment, the processing device 150 may select the corresponding virtual information Vf1 from the object information database for displaying according to the classification result of the target object Obj1.

In step S210, the processing device 150 determines the display position of the virtual information Vf1 of the target object Obj1 using the recognition result of the object recognition processing or the first reference position information according to the recognition result of the object recognition processing. In some embodiments, the processing device 150 may access reliability of the recognition result of the object recognition processing. When the processing device 150 determines that the recognition result of the object recognition processing is reliable, the processing device 150 may use the recognition result of the object recognition processing to determine the display position of the virtual information Vf1 of the target object Obj1. When the processing device 150 determines that the recognition result of the object recognition processing is unreliable, the processing device 150 may use the first reference position information obtained through the positioning device 130 to determine the display position of the virtual information Vf1 of the target object Obj1. The processing device 150 may determine whether the recognition result of the object recognition processing meets a specific condition so as to access reliability of the recognition result of the object recognition processing. In other words, according to whether the recognition result of the object recognition processing meets a specific condition, the processing device 150 may select one of the recognition results of the object recognition processing and the first reference position information to determine the display position of the virtual information Vf1 of the target object Obj1.

Figure 4:
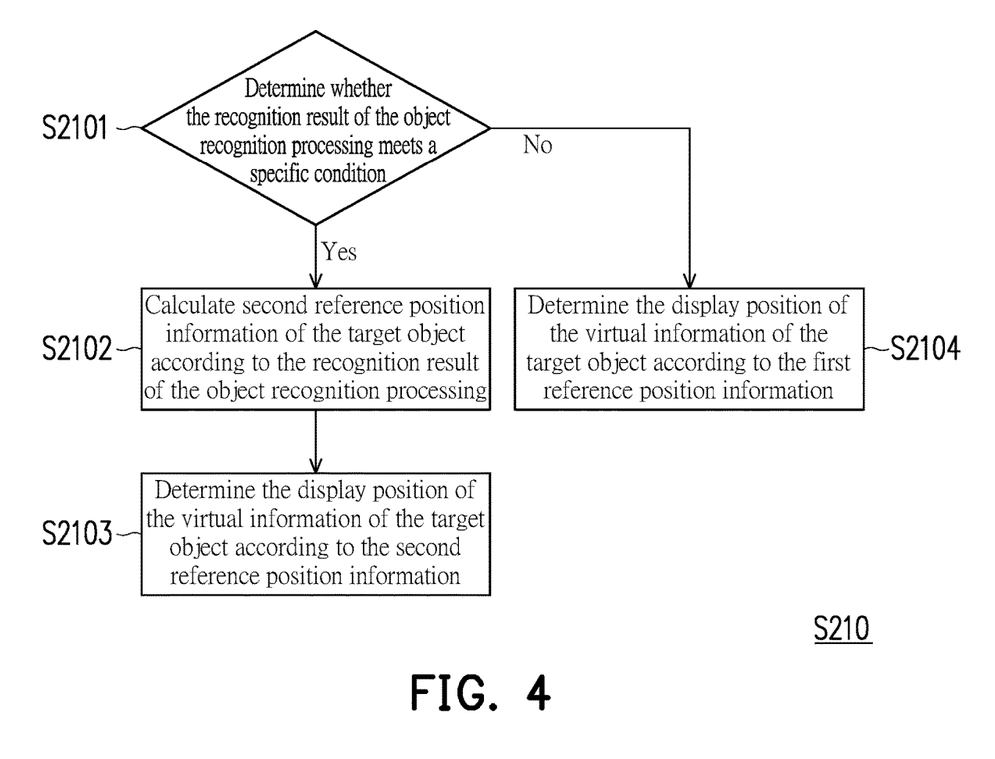
FIG. 4 is a flowchart for determining a display position of virtual information according to an exemplary embodiment of the disclosure.

FIG. 4 is a flowchart for determining a display position of virtual information according to an exemplary embodiment of the disclosure. With reference to FIG. 4, in step S2101, the processing device 150 determines whether the recognition result of the object recognition processing meets a specific condition. Settings of the specific condition will be described separately in subsequent exemplary embodiments.

If it is determined to be yes in step S2101, in step S2102, the processing device 150 calculates second reference position information of the target object Obj1 according to the recognition result of the object recognition processing in response to the recognition result of the object recognition processing meeting the specific condition. In step S2103, the processing device 150 determines the display position of the virtual information Vf1 of the target object Obj1 according to the second reference position information.

In some embodiments, the second reference position information includes a second display position coordinate on the light transmitting display 110. The processing device 150 may perform coordinate conversion on the image coordinate position of the object recognition bounding box of the target object Obj1 in the target image to calculate the three-dimensional coordinate position of the target object Obj1 in the three-dimensional coordinate system. Moreover, the processing device 150 may perform coordinate conversion and obtain the three-dimensional coordinate position of the user U1 in the same three-dimensional coordinate system through the information provided by the information capturing device 140. Accordingly, the processing device 150 may utilize the three-dimensional coordinate position of the target object Obj1 and the three-dimensional coordinate position of the user U1 to determine the second reference position information of the target object Obj1. For example, the second reference position information of the target object Obj1 (i.e., the second display position coordinate on the light transmitting display 110) may be the intersection position of the connecting line between the three-dimensional coordinate position of the target object Obj1 and the three-dimensional coordinate position of the user U1 intersecting the display plane of the light transmitting display 110. After that, the processing device 150 may determine the display position of the virtual information Vf1 on the light transmitting display 110 according to the intersection position.

Comparatively, if it is determined to be no in step S2101, in step S2104, the processing device 150 determines the display position of the virtual information of the target object according to the first reference position information in response to the recognition result of the object recognition processing not meeting the specific condition. It follows that, in some embodiments, the processing device 150 may respectively utilize the information provided by the positioning device 130 and the target image to calculate the first reference position information and the second reference position information. Accordingly, the processing device 150 may determine to use the first reference position information or the second reference position information to calculate the display position of the virtual information Vf1 on the light transmitting display 110 according to the image recognition result.

In some embodiments, the first reference position information and the second reference position information may each be implemented as a reference point on the display plane of the light transmitting display 110. Accordingly, the processing device 150 may utilize the first reference position information or the second reference position information of the target object Obj1 as reference to determine the display position of the virtual information Vf1. Based on various requirements or different applications, the processing device 150 may determine the actual display position of the virtual information Vf1 according to the first reference position information or the second reference position information, so that the user U1 may see the virtual information Vf1 near the target object Obj1 or see the virtual information Vf1 overlapped on the target object Obj1 through the light transmitting display 110.

With reference back to FIG. 2, in step S212, the processing device 150 displays the virtual information Vf1 through the light transmitting display 110 according to the display position of the virtual information Vf1. Here, the virtual information Vf1 may be navigation information of the outside scene, virtual interactive objects, or the like, and the disclosure is not limited thereto. The steps shown in FIG. 2 may be performed repeatedly during the moving process of the mobile vehicle. Based on the result of determining whether the recognition result of the image recognition processing meets the specific condition, the processing device 150 may respectively adopt the first reference position information and the second reference position information generated based on the image recognition result at different time points to determine the display position of the virtual information Vf1 at different time points. The processing device 150 may use the first reference position information to determine the display position of the virtual information Vf1 at the first time point. Moreover, the processing device 150 may use the second reference position information generated based on the image recognition result to determine the display position of the virtual information Vf1 at the second time point.

In some embodiments, the specific condition may include an occupation ratio of the object recognition bounding box occupying the target image being greater than a predetermined threshold. In other words, the processing device 150 may determine whether the occupation ratio of the object recognition bounding box occupying the target image is greater than the predetermined threshold. That is to say, the processing device 150 may determine whether the imaging size of the target object Obj1 in the target image is sufficient. If the occupation ratio of the object recognition bounding box of the target object Obj1 occupying the target image is not greater than the predetermined threshold, it indicates that the recognition result is unreliable.

In some embodiments, the specific condition may include determining that the target object Obj1 is detected according to the recognition result of the object recognition processing. In other words, the processing device 150 may determine whether the recognition result of the object recognition processing is that there is the recognition information of the target Obj. That is to say, the processing device 150 may determine whether the object recognition model outputs the recognition result that the target object is detected. If the recognition result of the object recognition processing is that there is no recognition information of the target object Obj1, the processing device 150 cannot calculate the display position of the virtual information Vf1 according to the target image.

For example, in some application scenarios, when the distance between the target object Obj1 and the mobile vehicle is relatively far, the object recognition processing based on the target image may incorrectly recognize or fail to recognize the target object, and the processing device 150 may use the geographic positioning information provided by the positioning device 130 to determine the display position of the virtual information Vf1. Comparatively, when the distance between the target object Obj1 and the mobile vehicle is appropriate, the processing device 150 may use image positioning technology to determine the display position of the virtual information Vf1.

In some embodiments, the specific condition may include the recognition result of the object recognition processing passing correctness verification. In other words, the processing device 150 may determine whether the recognition result of the object recognition processing passes correctness verification. For example, the processing device 150 may learn that the target object Obj1 is to appear in the field of view of the user U1 according to the information provided by the positioning device 130 and obtain the first object recognition code of the target object Obj1. Next, the processing device 150 may compare whether the first object recognition code of the target object Obj1 is the same as the second object recognition code output by the object recognition processing. If the first object recognition code is different from the second object recognition code, it indicates that the recognition result of the object recognition processing may be incorrect.

Figure 5:
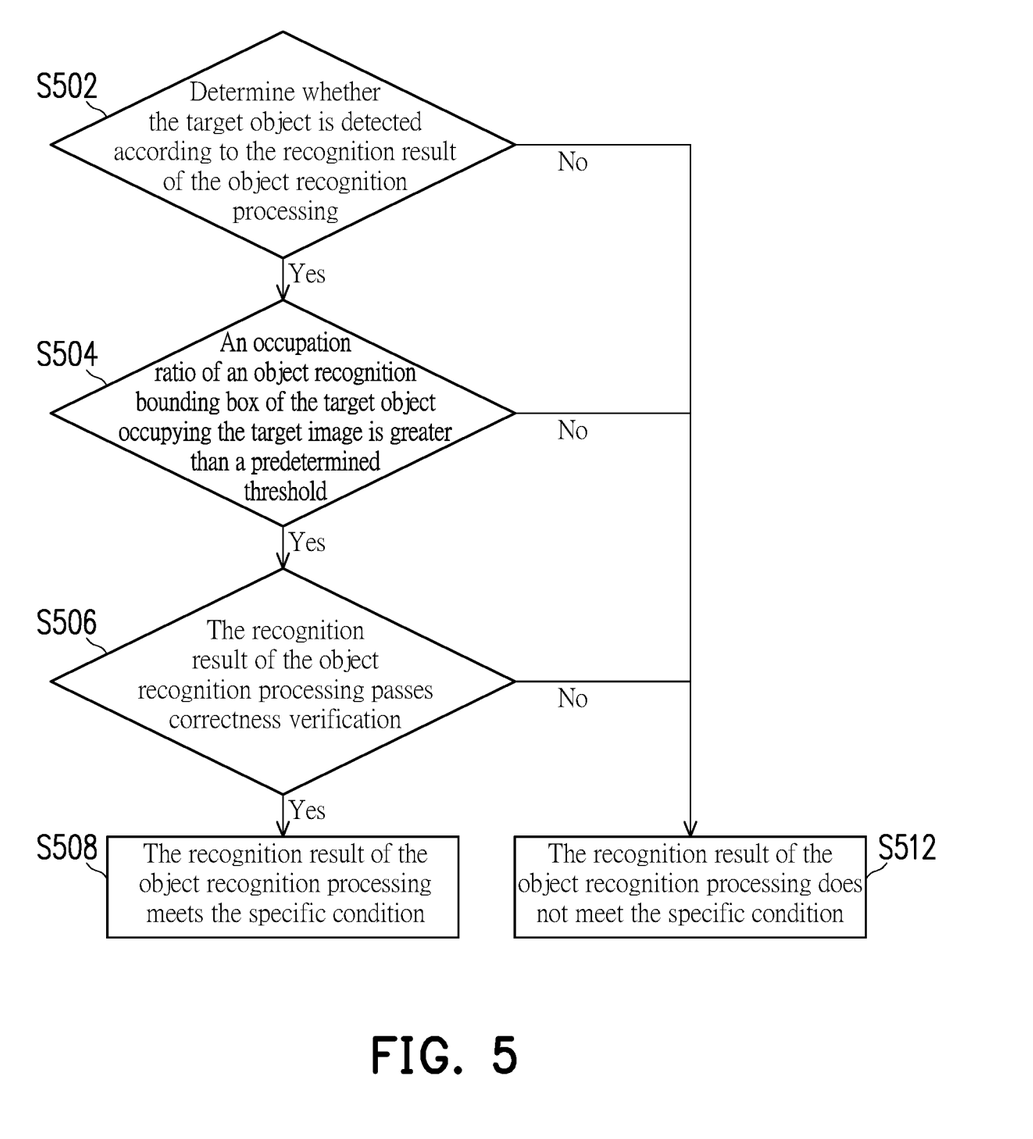
FIG. 5 is a flowchart for determining whether a recognition result meets a specific condition according to an exemplary embodiment of the disclosure.

Based on the above, FIG. 5 is a flowchart for determining whether a recognition result meets a specific condition according to an exemplary embodiment of the disclosure. With reference to FIG. 5, in step S502, the processing device 150 determines whether the target object Obj1 is detected according to the recognition result of the object recognition processing. If it is determined to be yes in step S502, it indicates that the processing device 150 may detect the existence of the target object Obj1 from the target image, and the processing device 150 may subsequently verify whether the recognition information of the target object Obj1 is reliable according to other determination criteria. As a result, in step S504, the processing device 150 determines that the occupation ratio of the object recognition bounding box of the target object Obj1 occupying the target image is greater than the predetermined threshold.

Figure 6:
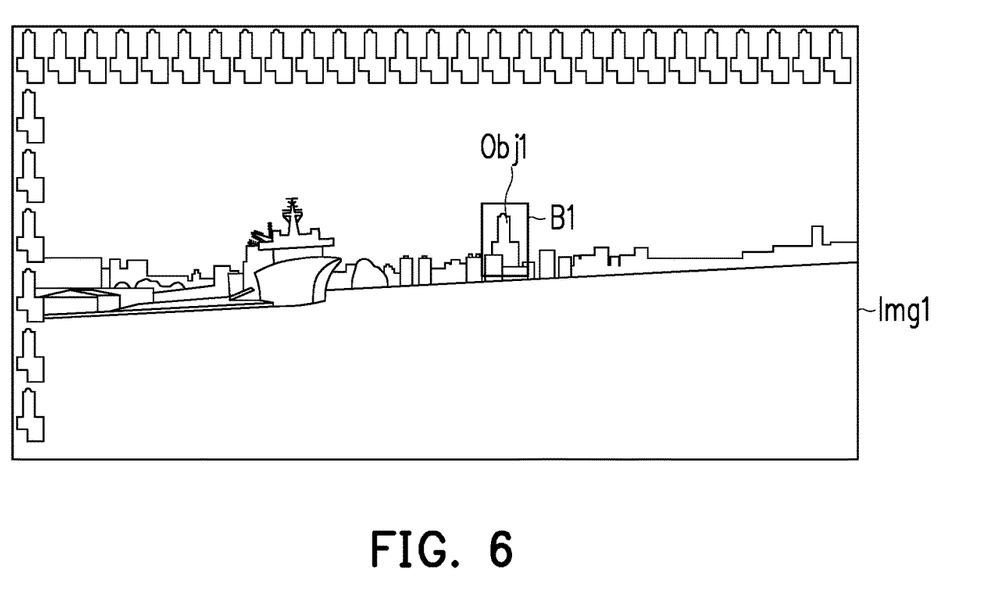
FIG. 6 is a schematic diagram of a target image and an object recognition bounding box according to an exemplary embodiment of the disclosure.

For example, FIG. 6 is a schematic diagram of a target image and an object recognition bounding box according to an exemplary embodiment of the disclosure. The processing device 150 may obtain an object recognition bounding box B1 of the target object Obj1 through performing object recognition processing on a target image Img1. The processing device 150 may calculate that the height and the width of the object recognition bounding box B1 are divided into a1 pixels and b1 pixels. Assuming that the resolution of the target image Img1 is M pixels*N pixels, the occupation ratio is (a1*b1)/(M*N). In addition, the predetermined threshold for comparing with the occupation ratio may be set according to actual requirements, which is not limited by the disclosure.

If it is determined to be yes in step S504, in step S506, the processing device 150 determines whether the recognition result of the object recognition processing passes correctness verification. If it is determined to be yes in step S506, in step S508, the processing device 150 determines that the recognition result of the object recognition processing meets the specific condition. If it is determined to be no in any one of step S502, step S504, or step S506, in step S510, the processing device 150 determines that the recognition result of the object recognition processing does not meet the specific condition. Nonetheless, in other embodiments, performing step S504 and step S506 is optional. For example, the processing device 150 may perform any one of step S504 and step S506. In addition, in other embodiments, the sequence of performing step S504 and step S506 is changeable.

In addition, when the recognition result of the object recognition processing does not meet the specific condition (e.g., the occupation ratio of the object recognition bounding box B1 is less than the threshold), the processing device 150 may control the image capturing device 120 to perform a zoom-in operation to capture a zoomed-in image, and perform object recognition processing again according to the zoomed-in image. Exemplary embodiment will be provided below for description.

Figure 7A:
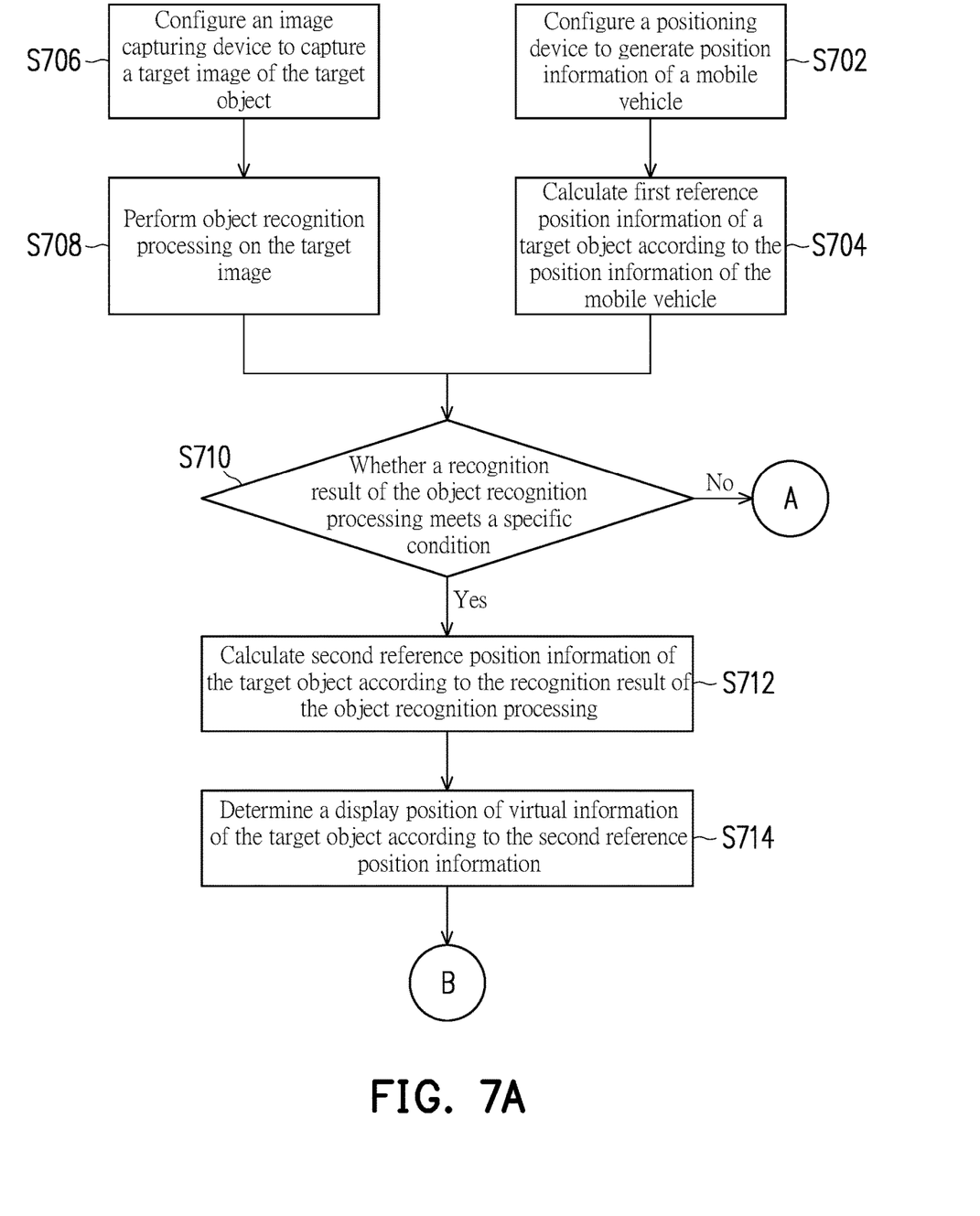
FIG. 7A and FIG. 7B are a flowchart of an information display method according to an exemplary embodiment of the disclosure.
Figure 7B:
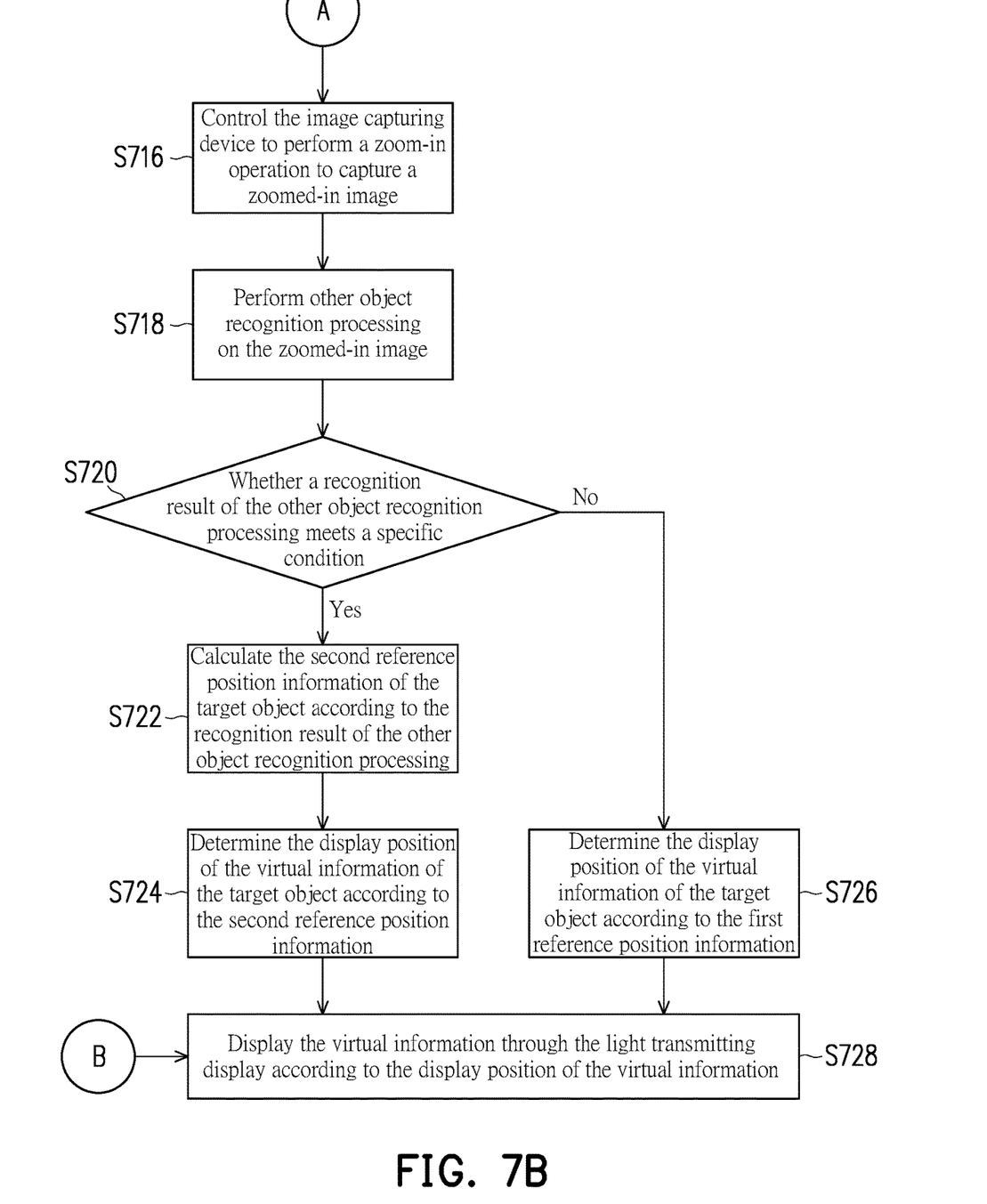

FIG. 7A and FIG. 7B are a flowchart of an information display method according to an exemplary embodiment of the disclosure. With reference to FIG. 1A, FIG. 1B, FIG. 7A, and FIG. 7B together, the process of the method of FIG. 7A and FIG. 7B may be realized by the information display system 100 of FIG. 1A and FIG. 1B. Here, the user U1 inside the mobile vehicle may view a physical scene outside the mobile vehicle and virtual information related thereto through the light transmitting display 110 of the information display system 100.

In step S702, the processing device 150 configures the positioning device 130 to generate position information of the mobile vehicle. In step S704, the processing device 150 calculates first reference position information of the target object Obj1 according to the position information of the mobile vehicle. In step S706, the processing device 150 configures the image capturing device 120 to capture a target image of the target object. In step S708, the processing device 150 performs object recognition processing on the target image. In step S710, the processing device 150 determines whether a recognition result of the object recognition processing meets a specific condition. If it is determined to be yes in step S710, in step S712, the processing device 150 calculates second reference position information of the target object according to the recognition result of the object recognition processing. In step S714, the processing device 150 determines a display position of virtual information of the target object Obj1 according to the second reference position information. Reference may be made to similar relevant descriptions in the embodiments above for details of step S702 to step S714, which will not be repeatedly described here.

Here, if it is determined to be no in step S710, in step S716, the processing device 150 controls the image capturing device 120 to perform a zoom-in operation to capture a zoomed-in image in response to the recognition result of the object recognition processing not meeting the specific condition. It follows that the imaging size of the target object Obj1 in the zoomed-in image is increased. For example, the processing device 150 controls the image capturing device 120 to switch lenses or perform zoom processing. The zoom processing may be optical zoom or digital zoom, which is not limited by the disclosure.

In step S718, the processing device 150 performs other object recognition processing on the zoomed-in image. In step S720, the processing device 150 determines whether a recognition result of the other object recognition processing meets a specific condition. In other words, the processing device 150 may determine whether the recognition result based on the zoomed-in image is reliable. Here, the processing device 150 may perform operation similar to step S710 to determine whether the recognition result of the other object recognition processing meets a specific condition. Reference may be made to the embodiments above for the detailed description of determining whether the image recognition result meets a specific condition.

If it is determined to be yes in step S720, in step S722, the processing device 150 calculates the second reference position information of the target object Obj1 according to the recognition result of the other object recognition processing in response to the recognition result of the other object recognition processing meeting the specific condition. In step S724, the processing device 150 determines the display position of the virtual information of the target object according to the second reference position information. If it is determined to be no in step S720, in step S726, the processing device 150 determines the display position of the virtual information Vf1 of the target object Obj1 according to the first reference position information in response to the recognition result of the other object recognition processing not meeting the specific condition.

In addition, in some embodiments, after determining the display position of the virtual information Vf1, according to the display ranges of multiple light transmitting display devices forming the light transmitting display 110 and the display position of the virtual information Vf1, the processing device 150 may also determine to display the virtual information Vf1 on which light transmitting display device, or to display parts of the virtual information Vf1 separately by two light transmitting display devices at the same time, to further adjust the display position of the virtual information Vf1.

Lastly, in step S728, the processing device 150 displays the virtual information Vf1 through the light transmitting display 110 according to the display position of the virtual information Vf1. For example, the virtual information Vf1 is the name or brief introduction of the target object Obj1.

In the method, the processing device, and the system for information display proposed by the exemplary embodiments of the disclosure, the display position of the virtual information of the target object on the light transmitting display may be determined by using different positioning technologies. Accordingly, it is possible not only to prevent the defects of different positioning technologies, but also to improve accuracy in overlapping the target object with the virtual information, enhancing the viewing experience of the user.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. An information display system installed on a mobile vehicle, the information display system comprising:
a light transmitting display;
an image capturing device configured to capture a target image of a target object;
a positioning device configured to generate position information of the mobile vehicle;
a processing device communicatively connected to the light transmitting display, the image capturing device, and the positioning device, the processing device being configured to:
calculate first reference position information of the target object according to the position information of the mobile vehicle;
perform object recognition processing on the target image;
determine a display position of virtual information of the target object using one of a recognition result of the object recognition processing and the first reference position information according to whether the recognition result of the object recognition processing meets a specific condition, wherein the recognition result comprises a position or a size of a bonding box of the target object; and
display the virtual information through the light transmitting display according to the display position of the virtual information,
wherein the processing device is configured to:
calculate second reference position information of the target object according to the recognition result of the object recognition processing and determine the display position of the virtual information of the target object according to the second reference position information in response to the recognition result of the object recognition processing meeting the specific condition; and
control the image capturing device to perform a zoom-in operation to capture a zoomed-in image in response to the recognition result of the object recognition processing not meeting the specific condition, and perform other object recognition processing on the zoomed-in image.

2. The information display system according to claim 1, wherein the first reference position information comprises a first display position coordinate on the light transmitting display, and the second reference position information comprises a second display position coordinate on the light transmitting display.

3. The information display system according to claim 1, wherein the processing device is configured to:
   determine the display position of the virtual information of the target object according to the first reference position information in response to the recognition result of the object recognition processing not meeting the specific condition.

4. The information display system according to claim 1, wherein the recognition result of the object recognition processing comprises an object recognition bounding box corresponding to the target object, and the specific condition comprises an occupation ratio of the object recognition bounding box occupying the target image being greater than a predetermined threshold.

5. The information display system according to claim 1, wherein the specific condition comprises determining that the target object is detected according to the recognition result of the object recognition processing.

6. The information display system according to claim 1, wherein the specific condition comprises the recognition result of the object recognition processing passing correctness verification.

7. The information display system according to claim 1, wherein the processing device is configured to:
   calculate the second reference position information of the target object according to a recognition result of the other object recognition processing and determine the display position of the virtual information of the target object according to the second reference position information in response to the recognition result of the other object recognition processing meeting the specific condition; and
   determine the display position of the virtual information of the target object according to the first reference position information in response to the recognition result of the other object recognition processing not meeting the specific condition.

8. The information display system according to claim 1, wherein the processing device is configured to:
   obtain a relative angle of the target object relative to the mobile vehicle according to the position information and a moving direction of the mobile vehicle, an absolute direction, and absolute position information of the target object;
   calculate a distance between the mobile vehicle and the target object according to the position information of the mobile vehicle and the absolute position information of the target object; and
   calculate the first reference position information of the target object according to the relative angle and the distance.

9. The information display system according to claim 8, wherein the absolute position information of the target object is recorded in an object information database.

10. An information display method applicable to an information display system comprising a light transmitting display, an image capturing device, a positioning device, and a processing device, wherein the information display system is installed on a mobile vehicle, and the method comprises:
    configuring the image capturing device to capture a target image of a target object;
    configuring the positioning device to generate position information of the mobile vehicle;
    calculating first reference position information of the target object according to the position information of the mobile vehicle;
    performing object recognition processing on the target image;
    determining a display position of virtual information of the target object using one of a recognition result of the object recognition processing and the first reference position information according to whether the recognition result of the object recognition processing meets a specific condition, wherein the recognition result comprises a position or a size of a bonding box of the target object; and
    displaying the virtual information through the light transmitting display according to the display position of the virtual information,
    wherein determining the display position of the virtual information of the target object using the recognition result of the object recognition processing or the first reference position information according to the recognition result of the object recognition processing comprises:
    calculating second reference position information of the target object according to the recognition result of the object recognition processing and determining the display position of the virtual information of the target object according to the second reference position information in response to the recognition result of the object recognition processing meeting the specific condition;
    controlling the image capturing device to perform a zoom-in operation to capture a zoomed-in image in response to the recognition result of the object recognition processing not meeting the specific condition; and
    performing other object recognition processing on the zoomed-in image.

11. The information display method according to claim 10, wherein the first reference position information comprises a first display position coordinate on the light transmitting display, and the second reference position information comprises a second display position coordinate on the light transmitting display.

12. The information display method according to claim 10, wherein determining the display position of the virtual information of the target object using the recognition result of the object recognition processing or the first reference position information according to the recognition result of the object recognition processing further comprises:
    determining the display position of the virtual information of the target object according to the first reference position information in response to the recognition result of the object recognition processing not meeting the specific condition.

13. The information display method according to claim 10, wherein the recognition result of the object recognition processing comprises an object recognition bounding box corresponding to the target object, and the specific condition comprises an occupation ratio of the object recognition bounding box occupying the target image being greater than a predetermined threshold.

14. The information display method according to claim 10, wherein the specific condition comprises determining that the target object is detected according to the recognition result of the object recognition processing.

15. The information display method according to claim 10, wherein the specific condition comprises the recognition result of the object recognition processing passing correctness verification.

16. The information display method according to claim 10, wherein determining the display position of the virtual information of the target object using the recognition result of the object recognition processing or the first reference position information according to the recognition result of the object recognition processing further comprises:

calculating the second reference position information of the target object according to a recognition result of the other object recognition processing and determining the display position of the virtual information of the target object according to the second reference position information in response to the recognition result of the other object recognition processing meeting the specific condition; and determining the display position of the virtual information of the target object according to the first reference position information in response to the recognition result of the other object recognition processing not meeting the specific condition.

17. The information display method according to claim 10, wherein calculating the first reference position information of the target object according to the position information of the mobile vehicle comprises:

obtaining a relative angle of the target object relative to the mobile vehicle according to the position information and a moving direction of the mobile vehicle, an absolute direction, and absolute position information of the target object;

calculating a distance between the mobile vehicle and the target object according to the position information of the mobile vehicle and the absolute position information of the target object; and calculating the first reference position information of the target object according to the relative angle and the distance.

18. A processing device installed on a mobile vehicle and communicatively connected to a light transmitting display, an image capturing device, and a positioning device, wherein the image capturing device is configured to capture a target image of a target object, the positioning device is configured to generate position information of the mobile vehicle, and the processing device comprises:

a memory configured to store data; and a processor connected to the memory and configured to:

calculate first reference position information of the target object according to the position information of the mobile vehicle;

perform object recognition processing on the target image;

determine a display position of virtual information of the target object using one of a recognition result of the object recognition processing and the first reference position information according to whether the recognition result of the object recognition processing meets a specific condition, wherein the recognition result comprises a position or a size of a bonding box of the target object; and display the virtual information through the light transmitting display according to the display position of the virtual information, wherein the processor is configured to:

calculate second reference position information of the target object according to the recognition result of the object recognition processing and determine the display position of the virtual information of the target object according to the second reference position information in response to the recognition result of the object recognition processing meeting the specific condition; and control the image capturing device to perform a zoom-in operation to capture a zoomed-in image in response to the recognition result of the object recognition processing not meeting the specific condition, and perform other object recognition processing on the zoomed-in image.

* * * * *